EXAMPLE I

A number of experiments were carried out using solutions of 1 M BAMBP in various solvents. The aqueous feed solution containing cesium in a concentration of 0.001 M; it was about 1 M in sodium hydroxide and had a pH value of about 13. The temperature of the solution was 25° C.; equal volumes of aqueous and organic solutions were contacted. The results, as distribution coefficients for cesium, "DC," (concentration in organic extract:concentration in aqueous raffinate), are listed in Table I.

Table I

1 M BAMBP diluted with: DC
- AMSCO–D95 _____ 25
- Nitrobenzene _____ 19
- Diisopropylbenzene _____ 100
- Shell–2342 _____ 260
- Soltrol–170 _____ 245

These results show that aliphatic diluents bring about considerably improved cesium extraction as compared with that accomplished with the aromatic diluents or the partly aromatic and partly aliphatic Amsco–D95.

Carbon tetrachloride was also found to be a suitable solvent. It has the desirable feature of being nonflammable and is ideally qualified for nuclear magnetic resonance work.

EXAMPLE II

An aqueous 0.001 M cesium nitrate solution, having a pH value of 5.1 and a temperature of 25° C., was used; two runs were carried out in each of which an aliquot of the feed solution was contacted for 15 minutes with an equal volume of an extractant. In the first run the extractant consisted of an 0.5 M solution of BAMBP in Soltrol–170; a cesium distribution coefficient of 0.006 was obtained.

In the second run the same solvent was used, but it also contained D2EHPA in a concentration of 0.23 M. The distribution coefficient in this run was 5.3. This shows the beneficial effect of D2EHPA on cesium extraction.

EXAMPLE III

Eight runs were carried out using an aqueous acidic waste solution (pH=4.5) containing cesium and a Soltrol–170 solution 0.5 M in BAMBP and 0.1 M in different phosphates. One control test was run without any phosphate. Equal volumes of organic and aqueous solutions were again contacted at 25° C. for 15 minutes. The results are compiled in Table II.

Table II

| | DC for Cs |
|---|---|
| None | 0.006 |
| Bis (2-ethylhexyl) phosphoric acid | 6.8 |
| Bis (2-ethylhexyl) 2-ethylhexyl phosphonate | 0.3 |
| Monodiisooctyl acid orthophosphate | 3.0 |
| Monoisooctyl acid orthophosphate | 3.2 |
| Octylphenyl acid phosphate | 1.73 |
| Tri (2-ethylhexyl) phosphate | 0.06 |
| Bis (2-ethylhexyl) hydrogen phosphite | 0.97 |

EXAMPLE IV

One series of runs was carried out using cesium-containing feed solutions of a pH value of 10.5, and another series with aliquots of an acidic waste solution having a pH value of 4 and containing cesium, cerium and strontium simultaneously. In both series of runs the feed solutions were contacted for 15 minutes at 25° C. with an equal volume of a Soltrol–170 extractant 0.5 M in BAMBP, but containing different concentrations of D2EHPA. The distribution coefficients obtained at the various D2EHPA concentrations are shown in Table III.

Table III

| 0.5 M BAMBP + D2EHPA, M | Distribution Coefficients | | |
|---|---|---|---|
| | pH=10.5 | pH=4 | |
| | Cesium | Cerium | Strontium |
| 0.0012 | 0.2 | | |
| | 0.5 | 0.35 | ~0 | ~0 |
| 0.006 | 1.5 | 0.76 | 0.014 | 0.003 |
| 0.01 | 1.7 | 1.47 | 0.45 | 0.007 |
| 0.05 | 2.7 | 4.74 | 0.94 | 0.11 |
| 0.1 | 2.0 | 5.48 | 2.59 | 0.41 |
| 0.5 | 0.2 | 2.88 | 13.2 | 6.86 |
| 1.0 | 0.1 | 1.12 | 15.0 | 16.2 |

It is obvious from the above results that there is a critical D2EHPA concentration for cesium extraction below and above which the extraction is reduced so as to yield a distribution coefficient of below 1. For the pH value of 10.5 this critical concentration was determined to be between 0.006 and 0.1 M, while for the pH value of 4 it was between about 0.01 and 1 M. Cerium and strontium extraction increased steadily with increasing D2EHPA content.

Therefore, if cesium is to be extracted alone, the D2EHPA concentration is best held between 0.01 M and 0.05 M, while for the coextraction of cesium, strontium, cerium and other rare earths, the D2EHPA concentration should best be between 0.2 and 0.4 M.

It is well to point out here that other lanthanide rare earths behave analogously to cerium and are coextracted under about the same conditions as cerium.

EXAMPLE V

A number of runs were carried out, all using as the extractant a Soltrol–170 solution 0.3 M in D2EHPA but containing varying quantities of BAMBP. The aqueous waste solution had a pH value of 4. Again equal volumes of organic and aqueous solutions were contacted at a temperature of 25° C. for 15 minutes. The distribution coefficients obtained are summarized in Table IV.

Table IV

| BAMBP, M | Distribution Coefficients | | | |
|---|---|---|---|---|
| | Na | Cs | Sr | Ce |
| 0.0008 | 0.04 | 0.03 | 13.23 | 12.30 |
| 0.006 | 0.04 | 0.03 | 11.35 | 11.70 |
| 0.01 | 0.04 | 0.03 | 11.52 | 11.80 |
| 0.05 | 0.04 | 0.06 | 9.49 | 12.03 |
| 0.1 | 0.04 | 0.16 | 8.24 | 12.25 |
| 0.5 | 0.05 | 4.72 | 3.07 | 7.10 |
| 1.0 | 0.06 | 16.4 | 1.85 | 7.40 |

These data show that sodium is not taken up to any substantial degree by the extractant of the process of this invention, no matter what the BAMBP concentration is; this might be a function of the D2EHPA. Cesium requires a minimum concentration of 0.15 M for the BAMBP in a 0.3 M solution of D2EHPA. Strontium and cerium values extracted very well, even with the lowest BAMBP concentration used, namely of 0.001 M. Thus, one way of isolating cesium is to extract the cerium and strontium first with a D2EHPA solution containing a low concentration of BAMBP and then to contact the aqueous phase with a D2EHPA solution containing a higher concentration of BAMBP, whereby the cesium will be extracted.

The following example compares the various long-chain phenols as to their extraction efficiency for sodium, strontium, cerium and cesium.

EXAMPLE VI

A feed solution was used that had a pH value of 4 and contained sodium, strontium, cerium and cesium in concentrations of about 0.001 M. The organic extractants were Soltrol–170 solutions, containing D2EHPA in a concentration of 0.3 M and the respective phenol in a concentration of 0.5 M. Equal volumes of organic and aqueous solutions were contacted at 25° C. for 15 minutes. The results are summarized in Table V.

*Table V*

|  | Distribution Coefficients | | | |
|---|---|---|---|---|
|  | Na | Sr | Ce | Cs |
| 4-Sec-butyl-2-(α methyl benzyl) phenol | 0.05 | 3.1 | 7.1 | 4.7 |
| o-Phenylphenol | 0.06 | 2.9 | 8.7 | 2.3 |
| p-Dodecylphenol | 0.26 | 2.7 | 6.1 | 0.27 |
| p-Chloro-o-benzylphenol | 0.06 | 2.3 | 6.0 | 2.5 |
| 4-Tert-butyl-2-(α methyl benzyl) phenol | 0.04 | 2.74 | 2.7 | 3.9 |

It is obvious from the above data that sodium is not extracted, for practical purposes, by the solvents of this invention. All other cations were satisfactorily taken up by the various phenol solutions. The poor cesium extraction obtained with p-dodecylphenyl cannot be explained; the low results might be due to excessive water solubility of the extractant.

The effect of variations in the pH value on the extraction of cesium, cerium and strontium is shown in the next example.

EXAMPLE VII

Aliquots of an aqueous nitric acid waste solution containing cesium, cerium and strontium values were contacted each with an equal volume of a Soltrol–170 solution 0.5 M in BAMBP and 0.23 M in D2EHPA. The temperature again was 25° C. and the contact time 15 minutes. The aqueous feed solutions had different pH values which had been obtained by the addition of varying amounts of sodium hydroxide. The results for the various pH values (after extraction) are given in Table VI.

*Table VI*

| Cesium | | Strontium | | Cerium | | Promethium | | Calcium | |
|---|---|---|---|---|---|---|---|---|---|
| pH | DC | pH | DC | pH | DC | pH | DC | pH | DC |
| 2.15 | 0.19 | 3.10 | 0.12 | 3.10 | 23.2 | 1.1 | 0.047 | 2.25 | 0.025 |
| 2.75 | 0.82 | 3.62 | 0.78 | 3.65 | 9.34 | 2.1 | 8.92 | 3.05 | 3.70 |
| 3.10 | 1.31 | 4.00 | 1.80 | 4.00 | 8.15 | 2.85 | 5.85 | 3.50 | 18.75 |
| 3.15 | 1.85 | 4.55 | 3.15 | 4.58 | 4.48 | 3.60 | 2.78 | 4.15 | 38.5 |
| 3.55 | 4.28 | 4.95 | 3.47 | 4.90 | 1.26 | 4.20 | 2.07 | 4.65 | 17.96 |
| 4.00 | 6.00 |  |  |  |  | 4.70 | 0.93 | 5.15 | 4.54 |
| 4.55 | 5.41 |  |  |  |  | 5.35 | 0.64 | 6.30 | 1.72 |
| 4.95 | 4.49 |  |  |  |  | 6.50 | 0.21 | 7.15 | 1.04 |
| 5.05 | 4.51 |  |  |  |  | 7.20 | 0.05 |  |  |
| 6.60 | 2.74 |  |  |  |  |  |  |  |  |
| 6.75 | 2.58 |  |  |  |  |  |  |  |  |
| 7.10 | 2.37 |  |  |  |  |  |  |  |  |
| 9.95 | 2.43 |  |  |  |  |  |  |  |  |
| 11.75 | 2.54 |  |  |  |  |  |  |  |  |

It will be noted that cesium extracted well at pH values between about 3 and 12; additional work showed that the pH value can be as high as 14. The cerium extraction drops off sharply with increasing pH value. Therefore, if cerium extraction is intended, the pH value should not be higher than 5. Strontium extracts well also at higher pH values. Promethium, a typical lanthanide, extracts well at pH values between 2 and 4, while calcium prefers the organic phase at pH values of between 3, perhaps even 2, and about 7.

In the following example the effect of temperature changes on cesium extraction is illustrated.

EXAMPLE VIII

Aliquots of a cesium solution having a pH value of 4.5 were extracted at different temperatures with a Soltrol–170 solution 0.5 M in BAMBP and 0.3 M in D2EPHA. The ratio of organic:aqueous again was 1, and the contact time was 15 minutes. The results are summarized in Table VII.

*Table VII*

| °C. | DC for Cs |
|---|---|
| 10 | 9.0 |
| 25 | 4.1 |
| 37 | 2.3 |
| 50 | 1.3 |

The above shows the improved cesium extraction at temperatures below room temperature.

EXAMPLE IX

A series of extraction studies were carried out at different pH values to determine the respective acid concentrations suitable for stripping the various values from the organic extractant.

For this purpose equal volumes of an organic solution (Soltrol–170, 0.5 M in BAMBP and 0.3 M in D2EHPA); and an aqueous feed solution were equilibrated for 15 minutes at 25° C. The aqueous feed solution contained cerium (0.004 M); calcium (0.0007 M); cesium (0.005 M); strontium (0.0035 M); and sodium hydroxide (0.035 M).

After phase separation, portions of the aqueous raffinate were then "regenerated" as feed solution by adding radioactive trace concentrations of cesium, promethium, strontium, cerium and calcium nitrates. The pH value of each portion was varied by adding nitric acid. This regenerated portion was again contacted with an aliquot of the above-specified organic extractant, and the distribution coefficient was determined as described above.

The results are summarized in Table VIII; the pH values were always measured after extraction.

*Table VIII*

| Strontium | | Cerium | | Calcium | | Promethium | | Cesium | |
|---|---|---|---|---|---|---|---|---|---|
| DC | pH | DC | pH | DC | pH | DC | pH | DC | pH |
| 1,247 | 5.05 | 0.18 | 11.90 | 361 | 3.70 | 0.0115 | 11.95 | 161 | 5.05 |
| 123 | 3.95 | 0.62 | 4.10 | 268 | 3.50 | 0.25 | 4.20 | 60.1 | 4.10 |
| 2.8 | 3.15 | 4,880 | 2.95 | 220 | 3.10 | 0.30 | 4.12 | 8.32 | 3.30 |
| 0.71 | 2.80 | 10,800 | 2.35 | 5.97 | 2.38 | 0.60 | 4.00 | 3.63 | 3.00 |
| 0.18 | 2.36 | 8,200 | 2.25 | 0.078 | 1.43 | 0.87 | 3.70 | 1.51 | 2.37 |
| 0.11 | 2.30 | 844 | 1.95 | 0.007 | 0.80 | 17.0 | 2.70 | 1.20 | 2.30 |
| 0.027 | 1.90 | 42.2 | 1.50 | 0.0018 | 0.32 | 2,680 | 2.60 | 0.64 | 1.95 |
| 0.003 | 1.50 | 1.07 | 0.90 |  |  | 67 | 1.57 | 0.21 | 1.54 |
| 0.0006 | 0.95 | 0.017 | 0.45 |  |  | 76 | 1.50 | 0.063 | 0.98 |
| 0.00007 | 0.50 |  |  |  |  | 0.52 | 0.90 | 0.016 | 0.55 |
|  |  |  |  |  |  | 0.012 | 0.40 |  |  |

United States Patent Office

3,302,993
Patented Feb. 7, 1967

3,302,993
PROCESS OF RECOVERING STRONTIUM, CESIUM, CERIUM AND RARE EARTH VALUES FROM RADIOACTIVE SOLUTIONS
Lane A. Bray, Richland, Wash., assignor to the United States of America as represented by the United States Atomic Energy Commission
No Drawing. Filed Mar. 11, 1963, Ser. No. 264,460
6 Claims. (Cl. 23—23)

The invention described herein was made in the course of, or under, a contract with the United States Atomic Energy Commission.

This invention deals with the separation and recovery of radioactive fission products, in particular of strontium, cesium, cerium and lanthanide rare earth metal values as they are present, for instance, in waste solutions obtained in the processing of nuclear fuel. The invention is particularly concerned with the simultaneous recovery of $Cs^{137}$ and the other fission products just listed. However, the process of this invention also lends itself well to the treatments of ore solutions and other solutions containing nonradioactive isotopes of the above-listed elements.

The isotopes $Sr^{90}$, $Cs^{137}$, $Ce^{144}$ and those of many of the lanthanide rare earth metals have a fairly long half-life and emit concentrated radioactivity for a considerable period of time; this radioactivity generates heat. These facts make removal of such fission products from the waste solutions imperative prior to disposal of the latter. Separation of these isotopes is also desirable for the purpose of recovery, because they have many uses. $Sr^{90}$, for instance, which has a half-life of 28 years and is a beta-emitter but does not give off gamma rays, is used as the heat source of thermoelectric generators. $Cs^{137}$ has a half-life of 30 years and is a gamma-emitter; it is valuable for food sterilization, for the polymerization of hydrocarbons, in radiotherapy and in radiography. $Ce^{144}$ (half-life 285 days) is used as a gamma-emitter for atomic batteries.

Strontium, calcium, barium and some of the lanthanide rare earths including cerium have been extracted heretofore from waste solutions with a solution of di-2-ethylhexylphosphoric acid (D2EHPA) in kerosene. This process is the subject matter of the assignee's copending application S. N. 202,337, now Patent No. 3,154,500, issued October 27, 1964 to George Jansen, Jr. et al. Cesium is not extracted in said process.

Another process uses long-chain phenols dissolved in aromatic hydrocarbons, such as xylene or diisopropyl benzene, for the extraction of the fission products listed above. This process is the subject matter of the assignee's copending application S. N. 225,936, now Patent No. 3,179,-503, issued April 20, 1965, to Donald E. Horner et al. The phenols there do not extract cesium from the normally acidic waste solutions, but the solutions have to be neutralized to a pH value of at least 12 to accomplish cesium extraction.

This neutralization of the waste solutions for extraction with long-chain phenols causes a considerable volume increase, a feature most undesirable for the storage on disposal of the solutions. Also, a high pH value is unfavorable for solutions having a high iron content, because then complexing of the iron is impossible. In order to extract cesium as well as strontium, cerium and rare earths from waste solutions by the above processes, two extraction steps and thus two units, have been necessary, one for the extraction of strontium, cerium and rare earths with D2EHPA and one for the subsequent extraction of cesium with phenol in an aromatic diluent, after alkalinization of the solution. This makes for a rather complicated and expensive process. Also, in the extraction with D2EHPA dissolved in an aromatic the addition of tributyl phosphate is necessary to prevent the formation of a third phase.

It is an object of this invention to provide a process for the processing of nuclear fuel waste solutions by which strontium, cesium, cerium and rare earths are extracted simultaneously in one step.

It is another object of this invention to provide a process for the extraction of cesium from nuclear fuel waste solutions which can be carried out from acidic as well as alkaline waste solutions.

It is still another object of this invention to recover cesium, cerium, strontium and lathanide rare earth metal values from aqueous waste solutions that can be applied to the solutions as they are obtained by solvent extraction of dissolver solutions of nuclear fuel.

It is also an object of this invention to provide a process for the extraction of nuclear fuel waste solutions in which no, or very little, sodium hydroxide is necessary for pH adjustment, so that a comparatively small volume of solution needs to be processed.

It is still another object of this invention to provide a process for the extraction of nuclear fuel waste solutions in which the addition of a suppressor for the formation of a third phase, such as the addition of tributyl phosphate, is not necessary.

It is furthermore an object of this invention to provide a process for the extraction of nuclear fuel waste solutions with a diluent solution of an extractant which uses comparatively inexpensive diluents.

It is finally also an object of this invention to provide a process for the recovery of cesium, cerium, strontium and/or lanthanide rare earth metal values from ore solutions, brines, etc. for which pH adjustment is not necessary.

It has been found that long-chain phenols, such as 4-sec-butyl-2-($\alpha$-methylbenzyl) - phenol (BAMBP), when dissolved in aliphatic hydrocarbons, instead of the aromatic ones used in application S.N. 202,337, extract cesium values to a higher degree than do the phenols when dissolved in aromatic diluents. Halogenated aliphatic hydrocarbons also have this improved effect. This will be illustrated later in Example I. It has also been found that, although BAMBP alone extracts cesium only at pH values of above 12, and although D2EHPA does not extract cesium at all, a mixture of D2EHPA with the phenols, due to some unknown synergistic effect, extracts cesium to a high degree at any pH value within the range of from 3 to 14. The beneficial effect of D2EHPA will be demonstrated later in Example II. The extraction of cerium and strontium decreases sharply with pH values increasing beyond 5 so that for coextraction of cesium with cerium and strontium the pH value is best maintained at between 3 and 5. These findings have been utilized in devising the processes of this invention.

One embodiment of this invention thus comprises adjusting the pH value of an aqueous cesium-containing waste solution to between 3 and 14, contacting the waste solution with a long-chain phenol and an organo-phosphorus compound dissolved in an aliphatic hydrocarbon or halogenated aliphatic hydrocarbon, whereby the cesium values are taken up by said phenol solution, and separating said phenol solution from the aqueous waste solution. The invention also comprises the process of adjusting the pH value of an aqueous waste solution containing strontium, cesium, cerium and lanthanide rare earths values to between 3 and 5, contacting the aqueous solution with an organic solution of a long-chain phenol plus di-2-ethylhexylphosphoric acid in an aliphatic or halogenated aliphatic hydrocarbon diluent, whereby said strontium, cesium, cerium and rare earth values are taken up by said aliphatic solution, and separating the aliphatic solution from the aqueous waste solution.

All aqueous mineral acid solutions are suitable for the process of this invention; most of the waste solutions obtained from solvent extraction processes for which this invention is primarily intended are nitric acid solutions. If the feed solutions contain iron, chromium, nickel and/or aluminum values, these cations should be complexed to make them solvent-nonextractable; citrate-, HEDTA- or tartrate-anions-containing compounds are suitable for this purpose.

Di-2-ethylhexylphosphoric acid is the preferred alkyl phosphoric acid. However, other related compounds such as bis (2-ethylhexyl) phosphoric acid, monodiisooctyl acid orthophosphate, monoisooctyl acid orthophosphate and octylphenyl acid phosphate have given satisfactory results as will be shown in Example III.

The concentration of these alkyl phosphoric acids was found to be critical, as will be shown later in Example IV. It will be demonstrated that for cesium extraction the D2EHPA concentration should be within the range of from 0.006 to 0.1 M when a BAMBP concentration of about 0.5 M is used. It will also be obvious from said example that below and above this range practically no cesium extraction takes place when the pH value of the aqueous feed solution is 10.5. However, from an acid solution having a pH value of 4, cesium extraction did take place up to a concentric of 1 M D2EHPA.

The phenols have to be those of a long-chain hydrocarbon, because the lower-chain phenols are not sufficiently water-immiscible. Water-immiscibility, of course, is necessary for phase separation after extraction. Phenols found suitable are BAMBP, 4-tert-butyl-2-($\alpha$ methyl benzyl) phenol (TerBAMBP), o-phenylphenol, p-dodecylphenol and p-chloro-o-benzylphenol. The effect of concentration changes of BAMBP in a kerosene-type hydrocarbon solution containing 0.3 M D2EHPA on cesium, strontium and cerium extractions will be shown in Example V.

The solvent yielding the best coextraction results for cerium, strontium and cesium was a solution containing BAMBP and D2EHPA in a molar ratio of about 5:3. A ratio of approximately 5 yielded optimal results for the extraction of cesium alone in most instances. For the purpose of the investigations leading to this invention, a solution containing 0.5 M BAMBP and 0.3 M D2EHPA was found best.

The use of the long-chain phenols together with the alkyl phosphoric acids of this invention has an additional advantage. While with D2EHPA alone as the extractant the formation of a third phase occurs, when washed with a 10% sodium carbonate solution according to the processes used heretofore, and the addition of tributyl phosphate was necessary for the suppression of that third phase BAMBP was found to have a similar effect as tributyl phosphate; no third phase occurs and tributyl phosphate need not be added. The various distribution coefficients obtained with some of the long-chain phenols intended for this invention are presented in Example VI.

A great number of aliphatic hydrocarbons and chlorinated aliphatic hydrocarbons, if substantially water-immiscible, can be used as the diluent, or solvent, for the alkyl phosphoric acid and long-chain phenols. Soltrol-170 was the preferred diluent; it is a paraffinic hydrocarbon with the following typical boiling range: initial boiling point at 424° F.; 10% distilled at 429° F.; 20% at 432° F.; 50% at 437° F.; 70% at 440° F.; 90% at 448° F.; 95% at 454° F.; and end point at 463° F. Soltrol-170 has a specific gravity, at 60° F., of 0.7728; a refractory index at 20° C. of 1.4315; a flash point at 760 mm. Hg. of 192° F. and a fire point of 210° F. The flash and fire points were determined in accordance with ASTM methods D56–52 and D92–52, respectively.

The pH value of the aqueous feed solution has an effect on the extraction of cesium, but a greater effect on the extraction of strontium, cerium and other lanthanide rare earths. It was found, as mentioned, that cesium can be extracted at a pH value within the range of from 3 to 14, but that the other fission products listed are only satisfactorily extracted within the pH range of from 3 to 5. Therefore the pH value has to be adjusted according to the extraction intended, that is to between 3 and 5, if a coextraction of strontium and lanthanides with the cesium is to be brought about. The effect of various pH values on the degree of extraction is illustrated in Example VII.

Room temperature is satisfactory for the process of his invention; however, it was found that cesium is extracted to a considerably higher degree if the feed as well as the extractant solution are cooled to about 10° C. This will be illustrated in Example VIII. On the other hand, cerium extraction is improved with increasing temperature. Therefore for coextraction of cesium plus cerium, a compromise temperature of about 35° C. is best, while for cesium extraction alone a temperature of about 10° C. is preferred.

The ratio of organic and aqueous solutions may vary widely. A ratio of from 10:1 to 1:10 for organic:aqueous is suitable, but equal volumes were usually found best. Extraction can be carried out in a batch process or in a continuous column operation.

After extraction the phases are separated from each other by conventional means. The fission product values can then be back-extracted from the organic solution by contact with aqueous mineral acid. Any mineral acid is suitable for this purpose as long as it does not bring about precipitation of the fission products. For instance, sulfuric acid is not operative for the back-extraction of strontium, because it forms water-insoluble strontium sulfate. If acid, for instance nitric acid of a pH value of 3, is used for back-extraction, cesium and strontium are back-extracted together, while cerium remains in the organic phase. The cerium can then be back-extracted with an acid having a pH of between 5 and 6 or below 1. Cesium and strontium can be separated from each other thereafter by known methods, e.g. by passing the strip solution containing these values over a cation exchange resin, as is known to those skilled in the art. Also, a simple $NaHCO_3$-NaOH addition will split the cesium from the strontium by the precipitation of the latter. An additional solvent extraction using D2EHPA or tributyl phosphate will extract the strontium away from the cesium, as is described in detail in assignee's copending application S.N. 202,337, mentioned above.

Instead of first co-stripping strontium and cesium, strontium and cerium can be back-extracted together from the organic phase by contact with an acid having a pH value close to 7; and this will leave the cesium in the organic phase. Cesium can then be back-extracted with an acid having a pH value of about 3. Experiments showing the nonextractability and thus the stripping with nitric acid of different pH values are summarized in Example IX.

In the following, the examples referred to in the preceding paragraphs are given to illustrate the conclusions summarized therein.

The above data and those of Table V show that the acid for stripping cesium should have a pH value of below about 2.5; that for stripping strontium a pH of below 2; that for stripping calcium either a pH value of below 1.5 or one of above 7; the acid for stripping promethium should have a pH value of below 1 or one of above about 4; and the acid for stripping cerium should have a pH value of below 1 or above 5.

It will be understood that the invention is not to be limited to the details given herein but that it may be modified within the scope of the appended claims.

What is claimed is:

1. A process of coextracting strontium, cesium, cerium and other lanthanide rate earth values from an aqueous solution containing such values comprising: adjusting the pH of said solution to a value of between 3 and 5; contacting said aqueous solution with a substantially water-immiscible aliphatic hydrocarbon solution containing a water-immiscible phenol selected from a group consisting of 4-sec-butyl-2-($\alpha$ methyl benzyl) phenol, o-phenylphenol, p-dodecylphenol, p-chloro-o-benzylphenol and 4-tert-butyl-2-($\alpha$ methyl benzyl) phenol and a water-immiscible alkyl phosphoric acid selected from a group consisting of bis(2-ethylhexyl) phosphoric acid, monodiisooctyl acid orthophosphate, monoisooctyl acid orthophosphate and octylphenyl acid phosphate; whereby strontium, cerium, cesium and lanthanide rare earth values are taken up by said aliphatic hydrocarbon solution; and separating said aliphatic hydrocarbon solution from said aqueous solution.

2. The process of claim 1 wherein the water-immiscible aliphatic hydrocarbon is a kerosene fraction, the water-immiscible phenol is 4-sec-butyl-2-($\alpha$ methyl benzyl) phenol and the water-immiscible alkyl phosphoric acid is di(2-ethylhexyl) phosphoric acid.

3. The process of claim 2 wherein the water-immiscible aliphatic hydrocarbon contains 0.15 to 1.0 M 4-sec-butyl-2-($\alpha$ methyl benzyl) phenol and 0.05 to 1.0 M di(2-ethylhexyl) phosphoric acid.

4. The process of claim 3 wherein the di(2-ethylhexyl) phosphoric acid is present in a concentration of from 0.2 to 0.4 M.

5. The process of claim 4 wherein the aqueous solution is at a pH of 4 and the 4-sec-butyl-2-($\alpha$ methylhexyl) phenol is present in a concentration of 0.5 M.

6. A process of separating cesium values from cerium and strontium values present together in an aqueous nitric acid solution with a pH of 4 comprising: contacting said aqueous solution with an aliphatic hydrocarbon solution 0.3 M in di(2-ethylhexyl) phosphoric acid and not more than 0.01 M in 4-sec-butyl-2-($\alpha$ methyl benzyl) phenol, whereby cerium and strontium are taken up by said hydrocarbon solution; separating said hydrocarbon solution from said aqueous solution; then contacting said aqueous solution with a second hydrocarbon solution 0.3 M in di(2-ethylhexyl) phosphoric acid and at least 0.15 M in 4-sec-butyl-2-($\alpha$ methyl benzyl) phenol, whereby cesium values are extracted; and separating said second hydrocarbon solution from said aqueous solution.

References Cited by the Examiner

UNITED STATES PATENTS

| | | | |
|---|---|---|---|
| 2,910,442 | 10/1959 | Kaplan. | |
| 3,047,601 | 7/1962 | Johnson | 23—23 X |
| 3,122,414 | 2/1964 | Horner et al. | 23—312 X |
| 3,154,500 | 10/1964 | Jansen et al. | 252—301.1 |
| 3,179,503 | 4/1965 | Horner et al. | 23—25 X |

OSCAR R. VERTIZ, *Primary Examiner.*

H. T. CARTER, *Assistant Examiner.*